US012610258B2

(12) United States Patent
Bizzarri et al.

(10) Patent No.: US 12,610,258 B2
(45) Date of Patent: Apr. 21, 2026

(54) CELLULAR COMMUNICATION SYSTEM FEATURING SON FUNCTIONALITY

(71) Applicant: TELECOM ITALIA S.p.A., Milan (IT)

(72) Inventors: Simone Bizzarri, Turin (IT); Gianluca Francini, Turin (IT); Giorgio Ghinamo, Turin (IT); Giuseppe Minerva, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 462 days.

(21) Appl. No.: 18/259,315

(22) PCT Filed: Dec. 20, 2021

(86) PCT No.: PCT/EP2021/086807
§ 371 (c)(1),
(2) Date: Jun. 26, 2023

(87) PCT Pub. No.: WO2022/144207
PCT Pub. Date: Jul. 7, 2022

(65) Prior Publication Data
US 2024/0064531 A1      Feb. 22, 2024

(30) Foreign Application Priority Data
Dec. 28, 2020      (IT) ......................... 102020000032514

(51) Int. Cl.
| | |
|---|---|
| *H04W 24/02* | (2009.01) |
| *H04W 24/08* | (2009.01) |
| H04W 84/18 | (2009.01) |

(52) U.S. Cl.
CPC ........... *H04W 24/02* (2013.01); *H04W 24/08* (2013.01); *H04W 84/18* (2013.01)

(58) Field of Classification Search
CPC ............................... H04W 24/02; H04L 12/28
(Continued)

(56) References Cited

U.S. PATENT DOCUMENTS

| | | | |
|---|---|---|---|
| 9,439,081 B1 | 9/2016 | Knebl et al. | |
| 2016/0212633 A1 | 7/2016 | Flanagan et al. | |
| 2022/0418002 A1* | 12/2022 | Dinan ................. | H04W 52/146 |

FOREIGN PATENT DOCUMENTS

| | | |
|---|---|---|
| EP | 2 750 432 A1 | 7/2014 |
| EP | 1 560 366 A1 | 8/2014 |

OTHER PUBLICATIONS

International Search Report and Written Opinion issued Mar. 17, 2022 in PCT/EP2021/086807 filed on Dec. 20, 2021, 14 pages.

* cited by examiner

*Primary Examiner* — Dang T Ton
(74) *Attorney, Agent, or Firm* — Oblon, McClelland, Maier & Neustadt, L.L.P.

(57) ABSTRACT

A method for configuring a cellular network comprising a plurality of network cells. The method comprises:
monitoring, during a monitoring time period, a performance indicator of each network cell for each one of a plurality of monitoring time intervals of said monitoring time period;
determining a plurality of sets of measured signal levels, wherein each set of measured signal levels is associated with a respective territorial portion of a geographic area covered by the cellular network, and wherein each measured signal level of each set of measured signal levels is associated with a respective measured network cell, among the plurality of network cells, at least partially within that territorial portion, with a respective
(Continued)

Figure 1:
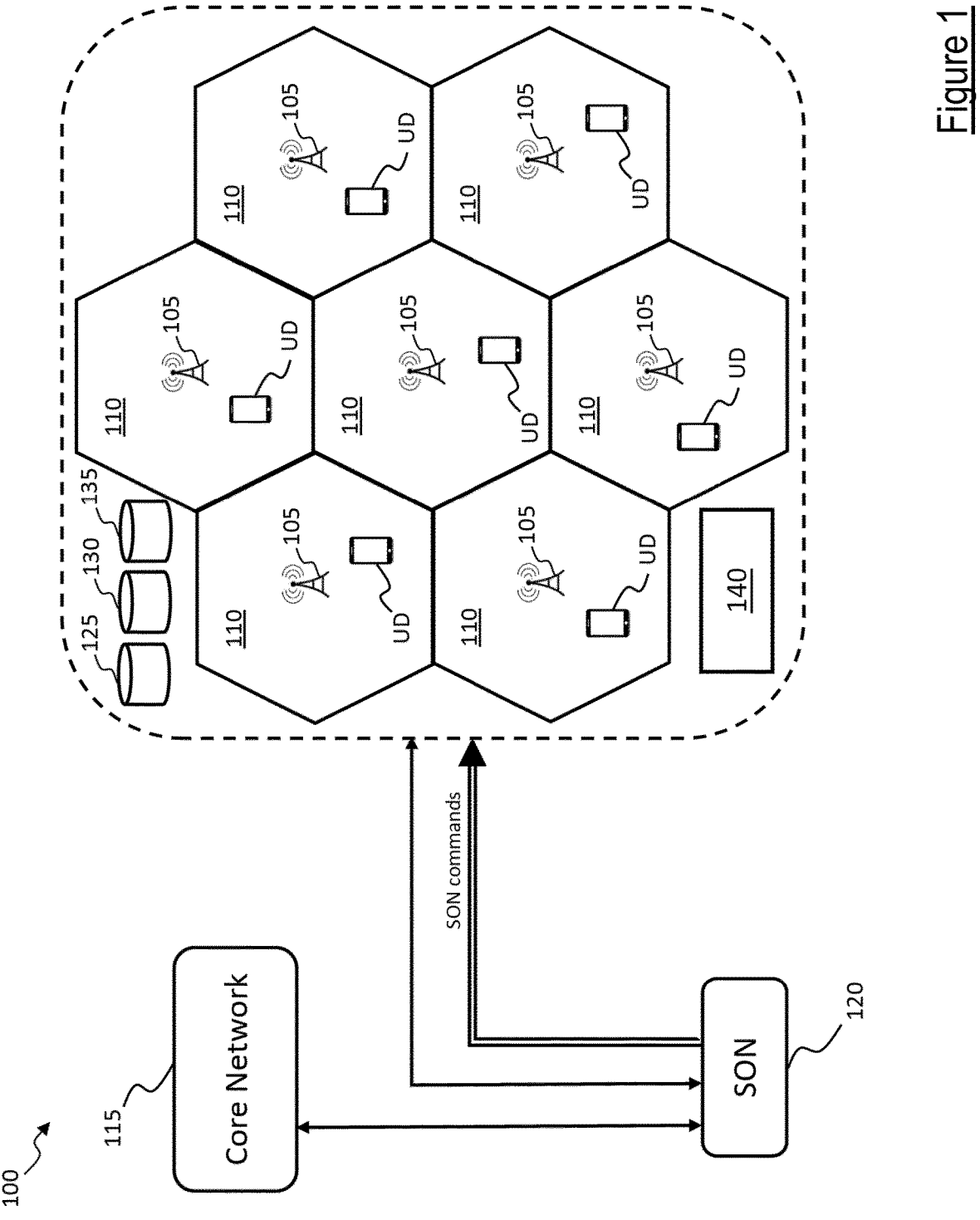

cell configuration of said measured network cell, and with a respective monitoring time interval;

determining, for each measured network cell, a simulated signal level being indicative of an expected signal level for that measured network cell in the respective cell configuration;

determining, for each measured network cell and for each monitoring time interval, a signal level deviation as a difference between the respective measured signal level and the respective simulated signal level;

for a reference network configuration (RNC1) including, for each measured network cell, a respective reference cell configuration taken by that measured network cell after the monitoring time period:

(i) determining, for each measured network cell, a reference simulated signal level indicative of an expected signal level for that measured network cell in the reference cell configuration;

(ii) updating, for each monitoring time interval, each measured signal level according to the respective simulated signal level and to the respective signal level deviation;

(iii) determining, for each measured network cell and for each monitoring time interval, an estimated performance indicator based on the respective performance indicator, on a number of sets of measured signal levels having at least one measured signal level associated with said measured network cell, and on the respective updated measured signal level, and configuring the cellular network according to the estimated performance indicators determined for the measured network cells.

10 Claims, 3 Drawing Sheets

(58) Field of Classification Search
USPC ................................. 370/329, 401, 402, 403
See application file for complete search history.

210
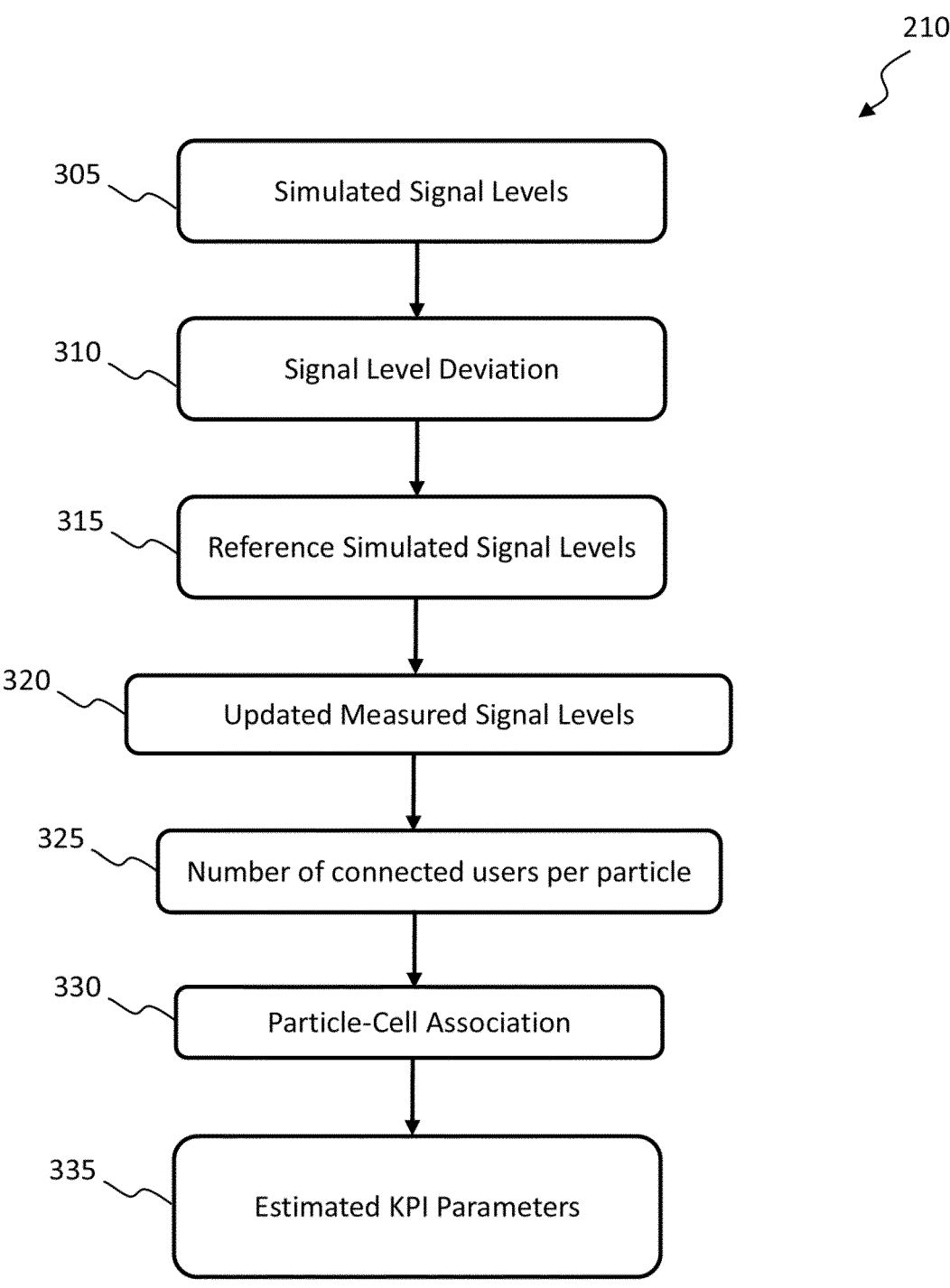
305 — Simulated Signal Levels
310 — Signal Level Deviation
315 — Reference Simulated Signal Levels
320 — Updated Measured Signal Levels
325 — Number of connected users per particle
330 — Particle-Cell Association
335 — Estimated KPI Parameters
<u>Figure 3</u>

CELLULAR COMMUNICATION SYSTEM FEATURING SON FUNCTIONALITY

BACKGROUND OF THE INVENTION

Field of the Invention

The present invention generally relates to cellular communication systems, such as 3G, LTE/LTE-Advanced and 5G cellular communication systems. Particularly, the present invention relates to cellular communication systems featuring "Self-Organizing Network" (SON) functionalities.

Overview of the Related Art

A conventional cellular communication system comprises a cellular network. The cellular network typically comprises a plurality of cellular communication equipment, each one providing radio coverage over one or more portions of a geographic area, or network cells.

Each cellular communication equipment typically comprises one or more electronic apparatuses and one or more antennas, so as to allow user devices (such as mobile phones, smartphones, tablets, personal digital assistants and computers) within the respective network cells (and connecting/ connected to the cellular communication system) to exchange data traffic (e.g., web browsing, e-mailing, voice, or multimedia data traffic).

Cellular communication systems exist which implement "Self-Organizing Network" (SON) functionalities.

According to SON principles, a configuration of the cellular network (hereinafter, network configuration) may be dynamically changed in order to achieve performance optimization.

Just as an example, SON functionalities based on CCO ("Coverage and Capacity Optimization") algorithms allow changing antenna parameters of the cellular communication equipment (and, hence, the radio coverages of the respective network cells) according to a geographical distribution of the user devices, thereby allowing to optimally distribute an offered data traffic with respect to radio resources available at the network cells.

Just as another example, SON functionalities based on MLB ("Mobility Load Balancing") algorithms allow user devices to be transferred from a network cell to a neighboring network cell by acting on handover parameters and thresholds.

Changes in the network configuration performed through SON functionalities are typically based on observations and statistical processing of parameters relating to the operation of the cellular network (such as "Key Performance Parameters", hereinafter KPI parameters) provided by proper monitoring apparatuses (such as performance counters) of the cellular network. Examples of KPI parameters comprise average throughput at each network cell, data traffic at each network cell, number of handovers, number of average active user devices, and downlink and uplink data volumes.

However, KPI parameters observations and processing require relatively long times (e.g., from 15' to 1 hour), which allows detecting issues in the performance of the cellular network (e.g., data traffic congestion or data traffic imbalance between neighboring network cells) only when the issues actually arise in the cellular network. This causes performance degradation.

In order to try to predict, and hence avoid, these issues in the performance of the cellular network, forecast procedures (e.g., forecast procedures based on "Artificial NeuralNetworks", hereinafter, ANN networks) have been proposed for forecasting the KPI parameters based on historical KPI parameters collected over a long or relatively long monitoring time period (e.g., of the order of several months).

An example of such forecast procedures is disclosed in U.S. Pat. No. 9,439,081. U.S. Pat. No. 9,439,081 discloses a computer-implemented method of forecasting wireless network performance. The method comprises receiving historical performance data and baseline data for a cell in a network. The historical performance data may comprise a plurality of key performance indicators (KPIs). The method further comprises receiving, from a user, a selection of a first KPI in the plurality of KPIs, applying a machine learning model to the first KPI and at least one KPI in the plurality of KPIs, generating at least one model parameter based on application of the machine learning model, applying the baseline data to the at least one model parameter, calculating a predicted value of the first KPI for the cell in the network based on the application of the baseline data to the at least one model parameter.

Another example of such forecast procedures is disclosed in U.S. Ser. No. 10/555,191. Particularly, U.S. Ser. No. 10/555,191 discloses a method for computing a standardized composite gain metric value for each solution that has been previously deployed to fix degradation issues at cell sites or other wireless nodes. The method selects a set of KPI parameters, each of which is highly correlated to customer experience. The method then assigns a weight to each KPI parameter, such that the weight reflects the relative importance of each KPI parameter and ensures that the KPI parameters are not double counted. For each solution deployed at a cell site, the method computes values of the following composite gain metrics: weighted gain and offload index. The method then can rank the solutions based on the computed composite gain metric values so that an optimum solution can be selected.

SUMMARY OF INVENTION

The Applicant has recognized that none of the cited prior art solutions is satisfactory.

Particularly, the Applicant has understood that the forecast procedures disclosed in U.S. Pat. No. 9,439,081 and U.S. Ser. No. 10/555,191 are based on inherently unreliable forecast models; indeed, due to changes in the network configuration during the monitoring time period, the corresponding historical KPI parameters used to train the ANN network are not consistent over time. For example, if during the monitoring time period a network cell experiences a decrease in the number of users due to a change in the network configuration, the forecast model is not able to understand that such a decrease is due to external factors (i.e., the change in the network configuration), rather it interprets such a decrease merely as a lower flow of users within the network cell.

On the one hand, reducing the monitoring time period (and, hence, the number of historical KPI parameters to be used to train the ANN network) in order to obtain historical KPI parameters lowly affected by the changes in the network configuration, would give rise to inaccurate forecast models: indeed, the longer the monitoring time period (and, hence, the more the historical KPI parameters), the more accurate the forecast models.

On the other hand, by reducing the coverage areas of the network cells in order to obtain a more homogeneous distribution of the users, would result in wide statistical fluctuations of the KPI parameters as the performance counters depend on the coverage areas of the network cells (the KPI parameters being aggregated data that are aggregated per network cells).

Although event tracing and/or radio measurement reporting (e.g., radio measurement reported by the user devices through "Minimization of Drive Test" (MDT) functionality) could in principle avoid the use of the aggregated data (in that event traces and radio measurement reporting may feature a high or relatively high geographical detail), a wide use of event traces and/or radio measurement reporting is precluded by the associated heavy processing and by the low or relatively low availability of network elements supporting event tracing or of user devices supporting radio measurement reporting (which would result in long reporting time periods to generate statistically valid data).

Moreover, KPI parameters and tracing/reporting data have different features both in terms of processing times (the KPI parameters provide information with a finer time detail than tracing/reporting data) and in terms of geographical details (the KPI parameters provide information with a high level of territorial aggregation, whereas tracing/reporting data provide geographically detailed information on user behavior), whereby the concurrent use of KPI parameters and tracing/reporting data for implementing SON functionalities is difficult to implement in practical cases and/or may result not satisfactory.

Last but not least, the drawbacks of the above are exacerbated in cellular communication systems (such as 5G cellular communication systems) in which the users may perform (through their own user devices) data transmission/reception in the respective serving network cells on different frequency bands (hereinafter, cell layers); in this case, the changes in the network configuration may result in a different distribution of the users among the cell layers.

In view of the above, the Applicant has tackled the above-mentioned issues, and has devised a method for optimizing the network configuration by using both KPI parameters and tracing/reporting data.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for configuring a cellular network comprising a plurality of network cells. According to an embodiment, the method may comprise monitoring, during a monitoring time period, a performance indicator of each network cell for each one of a plurality of monitoring time intervals of said monitoring time period. According to an embodiment, the method may comprise determining a plurality of sets of measured signal levels. Each set of measured signal levels may be associated with a respective territorial portion of a geographic area covered by the cellular network. Each measured signal level of each set of measured signal levels may be associated with a respective measured network cell, among the plurality of network cells, at least partially within that territorial portion, with a respective cell configuration of said measured network cell, and with a respective monitoring time interval. According to an embodiment, the method may comprise determining, for each measured network cell, a simulated signal level being indicative of an expected signal level for that measured network cell in the respective cell configuration. According to an embodiment, the method may comprise determining, for each measured network cell and for each monitoring time interval, a signal level deviation as a difference between the respective measured signal level and the respective simulated signal level. According to an embodiment, the method may comprise, for a reference network configuration including, for each measured network cell, a respective reference cell configuration taken by that measured network cell after the monitoring time period:

(i) determining, for each measured network cell, a reference simulated signal level indicative of an expected signal level for that measured network cell in the reference cell configuration;

(ii) updating, for each monitoring time interval, each measured signal level according to the respective simulated signal level and to the respective signal level deviation;

(iii) determining, for each measured network cell and for each monitoring time interval, an estimated performance indicator based on the respective performance indicator, on a number of sets of measured signal levels having at least one measured signal level associated with said measured network cell, and on the respective updated measured signal level.

According to an embodiment, the method may comprise configuring the cellular network according to the estimated performance indicators determined for the measured network cells.

According to an embodiment, whose features are additional or alternative to any features of the previous embodiments, each said estimated performance indicator is indicative of a change in the performance indicator affecting said measured network cell when switching from the respective cell configuration to the respective reference cell configuration.

According to an embodiment, whose features are additional or alternative to any features of the previous embodiments, said determining, for each measured network cell and for each monitoring time interval, an estimated performance indicator comprises:

apportioning the corresponding performance indicator among the territorial portions having at least one measured signal level associated with that measured network cell;

associating the measured network cell to the territorial portion within which the measured network cell is a serving network cell, thereby obtaining at least one associated territorial portion being associated with the measured network cell;

determining the estimated performance indicator based on the apportioned performance indicator associated with the measured network cell and on said at least one associated territorial portion.

According to an embodiment, whose features are additional or alternative to any features of the previous embodiments, said associating is based, for each measured network cell and for each monitoring time interval, on a comparison between the respective updated measured signal level and at least one threshold signal level indicative of a minimum signal level for accessing the measured network cell.

According to an embodiment, whose features are additional or alternative to any features of the previous embodiments, said associating is based on a distribution matrix indicative of a user distribution within the geographic area.

According to an embodiment, whose features are additional or alternative to any features of the previous embodiments, said updating comprises, for each monitoring time interval and for each measured network cell, adding the respective signal level deviation to the respective reference simulated signal level.

According to an embodiment, whose features are additional or alternative to any features of the previous embodiments, said configuring comprises:

(a) determining a further reference network configuration including, for each network cell, a respective further reference cell configuration;

(b) determining further estimated performance indicators for the further reference network configuration; said determining may for example comprise performing steps (i)-(iii) for the further reference network configuration;

(c) determining a cost function depending on the further estimated performance indicators, and iterating steps (a)-(c) until the cost function is optimized.

According to an embodiment, whose features are additional or alternative to any features of the previous embodiments, said determining a further reference network configuration is based on:

forecast performance indicators being forecasted from said estimated performance indicators by using:

an artificial neural network; or an optimization algorithm comprising at least one between a "Coverage and Capacity Optimization" algorithm and a "Mobility Load Balancing" algorithm.

According to an embodiment, whose features are additional or alternative to any features of the previous embodiments, the performance indicator comprises, for each network cell, at least one among a number of active users, a traffic volume managed by the network cell, and a number of users in the network cell upon occurrence of a predetermined event.

According to an embodiment, whose features are additional or alternative to any features of the previous embodiments, said determining a plurality of sets of measured signal levels is based on at least one between:

geo-localized procedure and/or event traces collected by network elements of the cellular network; and radio measurements combined with positioning information, reported by user devices connected to the cellular network.

Another aspect of the present invention relates to a cellular communication system configured to perform the method of the above.

BRIEF DESCRIPTION OF THE ANNEXED DRAWINGS

Figure 2:
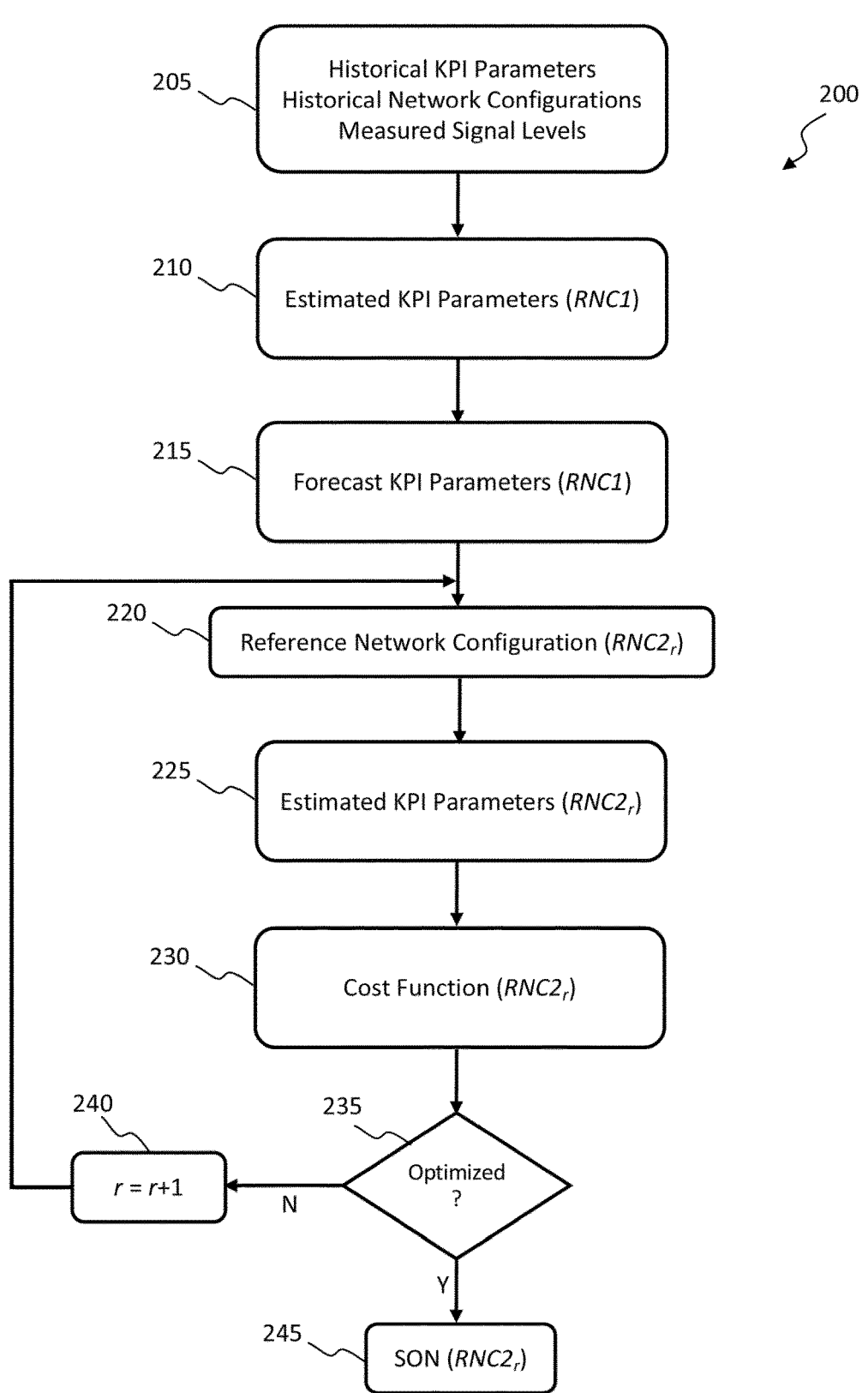

These and other features and advantages of the invention will be made apparent by the following description of some exemplary and non-limitative embodiments thereof. For its better intelligibility, the following description should be read making reference to the attached drawings, wherein:

FIG. 1 schematically shows a cellular communication system according to an embodiment of the present invention;

FIG. 2 schematically shows an activity flow of a method adapted to be used in the cellular communication system, according to an embodiment of the present invention, and FIG. 3 schematically shows an activity flow of a procedure of said method, according to an embodiment of the present invention.

DETAILED DESCRIPTION OF PREFERRED EMBODIMENTS OF THE INVENTION

With reference to the drawings, a cellular communication system 100 (i.e., a portion thereof) according to an embodiment of the present invention is schematically illustrated in FIG. 1.

In the following, when one or more features of the cellular communication system 100 (and of a method implemented by it) are introduced by the wording "according to an embodiment", they are to be construed as features additional or alternative to any features previously introduced, unless otherwise indicated and/or unless there is evident incompatibility among feature combinations that is immediately apparent to the person skilled in the art.

According to an embodiment, the cellular communication system 100 comprises a cellular network.

According to an embodiment, the cellular network comprises a plurality of cellular communication equipment 105 providing radio coverage over a geographic area.

According to an embodiment, each cellular communication equipment 105 is configured to provide radio coverage over (or, equivalently, is associated with) one or more portions of the geographic area, or network cells, 110.

In the exemplary, simplified scenario herein considered, each cellular communication equipment 105 is associated with a respective network cell 110. In a practical scenario, each cellular communication equipment 105 may be associated with a plurality of network cells, such as three network cells.

According to an embodiment, as exemplary illustrated, each network cell 110 is hexagonal in shape. In practice, though, a cell shape may differ significantly from an ideal hexagonal shape, e.g. due to geographical and/or propagation characteristics or constraints of the area where the cell is located.

According to an embodiment, each cellular communication equipment 105 comprises one or more electronic apparatuses (not shown). Example of electronic apparatuses include, but are not limited to, transceivers and digital signal processors.

According to an embodiment, each cellular communication equipment 105 comprises one or more antennas.

According to an embodiment, the cellular communication equipment 105 allow user devices UD within the respective network cells 110 (and connecting/connected to the cellular communication system 100) to exchange data traffic (e.g., web browsing, e-mailing, voice, or multimedia data traffic).

The user devices UD may for example comprise personal devices owned by users of the cellular communication system 100 (the users being for example subscribers of services offered by the cellular communication system 100). Examples of user devices UD comprise, but are not limited to, mobile phones, smartphones, tablets, personal digital assistants and computers.

According to an embodiment, the cellular network forms the radio access network.

The radio access network (and, more generally, the cellular communication system 100) may be based on any suitable radio access technology. Examples of radio access technologies include, but are not limited to, UTRA ("UMTS Terrestrial Radio Access"), WCDMA ("Wideband Code Division Multiple Access"), CDMA2000, LTE ("Long Term Evolution"), LTE-Advanced, and NR ("New Radio").

According to an embodiment, the radio access network is communicably coupled with one or more core networks, such as the core network 115. The core network 115 may be any type of network configured to provide aggregation, authentication, call control/switching, charging, service invocation, gateway and subscriber database functionalities, or at least a subset (i.e., one or more) thereof.

According to an embodiment, the core network 115 comprises a 4G/LTE core network or a 5G core network.

According to an embodiment, the core network 115 is communicably coupled with other networks, such as the Internet and/or public switched telephone networks (not shown).

According to an embodiment, the cellular communication system 100 is provided with "Self-Organizing Network" (SON) functionalities, i.e. functionalities that allow setting (i.e., tuning or adjusting) one or more parameters of the network cells 110 (hereinafter, cell parameters). According to an embodiment, the cell parameters of each network cell define a configuration of that network cell (hereinafter, cell configuration), and the cell configurations of the network cells of the cellular network define a configuration of the cellular network (hereinafter, network configuration).

According to an embodiment, the cell parameters comprise, but are not limited to, one or more antenna parameters. Examples of antenna parameters include, but are not limited to, transmitted power, antenna electrical tilt, azimuth, gain and antenna radiation pattern (e.g. pointing direction, directivity and width of one or more lobes of the pattern of lobes exhibited by the antenna radiation pattern).

According to an embodiment, the cellular communication system 100 comprises a SON module 120, i.e. a processing module that allows implementing the SON functionalities. The SON module 120 may be implemented by software, hardware, and/or a combination thereof.

According to an embodiment, the cell parameters (or, more generally, the cell configurations, and hence the network configurations) are set through proper commands, hereinafter referred to as SON commands, from the SON module 120 to the cellular network.

According to an embodiment, the SON module 120 is located external to both the cellular network and the core network 115. According to alternative embodiments, the SON module 120 is located in the core network 115 (e.g., in one or more modules thereof) or in any other entity of the cellular network or of the cellular communication system 100. According to an embodiment, the physical location of the SON module 120 depends on the implemented SON network architecture (e.g., distributed SON network, centralized SON network or hybrid SON network).

According to an embodiment, the SON module 120 is configured to perform a method (hereinafter, SON method) for configuring the cellular network, and particularly for optimizing the cell parameters (or equivalently, the cell configurations, and hence the network configuration).

According to an embodiment, the SON method is based on measurements of one or more parameters relating to the operation of the cellular network (hereinafter, operating parameters).

According to an embodiment, the measurements of the operating parameters may be performed by any suitable entity of the cellular communication system 100.

According to an embodiment, the measurements of the operating parameters are collected by the SON module 120. According to an embodiment, the measurements of the operating parameters are collected by the SON module 120 based on proper signaling exchange with the cellular network (and/or with the user devices UD connected thereto, as better discussed in the following) and/or with the core network 115 (this is conceptually represented in the figure by a double-headed arrow between the SON module 120 and the cellular network, and a double-headed arrow between the SON module 120 and the core network 115).

According to an embodiment, the operating parameters comprise one or more performance indicators (typically denoted as "Key Performance Indicators" in cellular communication networks, hereinafter KPI parameters). According to an embodiment, the KPI parameters comprise, for each network cell 110, a number of active users. Additionally or alternatively, the KPI parameters may comprise traffic volumes managed by the network cell 110, and/or a number of users in the network cell 110 upon occurrence of any predetermined network event in that network cell.

According to an embodiment, the measurements of the KPI parameters are performed by proper performance counters of the cellular network. According to an embodiment, the performance counters are implemented in the cellular communication equipment 105.

According to an embodiment, the operating parameters comprise a signal strength (or signal level) of each network cell 110.

According to an embodiment, the measurements of the signal levels are performed based on procedure and/or event traces collected by network elements (such as the cellular communication equipment 105) of the cellular communication system 100.

According to procedure and/or event traces, for each user device UD connected to the cellular communication system 100, procedures and/or events (including, but are not limited to, voice call, data call, and related signaling procedures) are traced, e.g. in order to allow periodically detecting the signal levels associated with a respective serving network cell as well as with network cells adjacent thereto.

According to an embodiment, the traced procedures and/or events are geo-localized traced procedures and/or events.

According to an embodiment, geo-localizations of the traced procedures and/or events is achieved by means of one or more among "Timing Advance" information (e.g., if the cellular communication system 100 is a LTE/LTE-Advanced cellular communication system), "Angle of Arrival" information (e.g., if the cellular communication system 100 is a 5G cellular communication system), "Global Navigation Satellite System" (GNSS)/"Assisted Global Navigation Satellite System" (A-GNSS) information, and triangulation techniques.

According to an embodiment, the measurements of the signal levels are performed, additionally or alternatively to procedure and/or event traces reported from the network elements, based on radio measurements reported by the user devices UD connected to the cellular network. According to an embodiment, radio measurement reporting is performed by the user devices UD through "Minimization of Drive Test" (MDT) functionality.

Examples of radio measurements include, but are not limited to, RSRP ("Received Signal Received Power"), RSRQ ("Received Signal Received Quality"), RSCP ("Received Signal Code Power"), "Pilot Chip Energy to Interference Power Spectral Density", "Data Volume", scheduled IP throughput, packet delay, packet loss rate, RTT ("Round Trip Time") and RXTX_TIMEDIFF measurements.

According to an embodiment, the radio measurements reported by each user device UD may comprise layer information, i.e. information about frequency layers (or frequency bands, such as 800 MHz, 1800 MHz, 2600 MHz) through which the user device UD may perform data transmission/reception in the respective serving network cell (hereinafter, cell layer).

By using the MDT functionality, the radio measurements reported by the user devices UD are advantageously combined with positioning information. Positioning information may for example be provided by the user devices UD (e.g., by exploiting GPS and/or GNSS/A-GNSS functionalities thereof) and/or computed by the cellular communication system 100 (e.g., by the core network 115) based on the radio measurements. Examples of positioning information computed by the cellular communication system 100 include, but are not limited to, ranging measurements based on localization signals emitted by any properly configured cellular communication equipment, and/or triangulations on signals of the cellular network.

In the following, the geo-localized procedures and/or events traces, and/or the radio measurements (combined with positioning information) reported by the user devices UD (for example, through MDT functionality) will be concisely referred to as tracing/reporting data.

According to an embodiment, the measurements of the signal levels may be based, additionally or alternatively to the tracing/reporting data, on proper a priori data (e.g., in order to at least reduce a computational effort involved by the tracing/reporting data). Examples of a priori data may comprise measurements of the signal levels having no correlation with the measurements of the KPI parameters, such as measurements of the signal levels performed outside the monitoring time period.

In the following, each set (of a plurality of sets) of the measurements of the signal levels associated with a territorial portion (hereinafter, territorial pixel) of the geographic area will be denoted by measurement particle. By set of measurements of the signal levels associated with a territorial pixel it is herein meant the measurements of the signal levels obtained from the tracing/reporting data and/or from the a priori data associated with that territorial pixel.

In the following, the exemplary scenario will be considered in which the measurements of the signal levels are assumed to be obtained from the tracing/reporting data.

According to an embodiment, each territorial pixel is identified by latitude and longitude coordinates. According to an embodiment, each territorial pixel represents a small or relatively small portion of the geographic area. According to an embodiment, each territorial pixel may have a size of approximatively 50 m×50 m in extra-urban scenarios approximatively 10 m×10 m in urban scenarios.

In the following, each network cell for which one or more measurements of the signal levels are available will be denoted by measured network cells, and each measured network cell whose measurements of the signal levels belong to (i.e., are included in) a measurement particle will be denoted by measured network cell associated with that measurement particle.

As it should be understood, each network cell may be associated with one or more measurement particles: indeed, the measurements of the signal levels based on the tracing/reporting data associated with a territorial pixel may comprise the measurements of the signal levels of network cells, among the plurality of network cells, at least partially covering that territorial pixel. The network cells detected as at least partially within a territorial pixel may comprise both serving network cells and neighboring network cells (such as neighboring network cells in different frequency layers).

According to an embodiment, the cellular communication system 100 comprises one or more network databases configured to store the operating parameters and the cell parameters.

According to an embodiment, the network databases comprise a network database (hereinafter, KPI database) 125 configured to store the KPI parameters of each network cell 110 (and, hence, in the example at issue, the number of active users within each network cell 110).

According to an embodiment, the KPI database 125 is configured to store historical KPI parameters, e.g. indicative of historical number of active users within each network cell 110. According to an embodiment, for each network cell 110, the historical KPI parameters comprise a sequence of KPI parameters monitored and measured, for that network cell 110, at monitoring time intervals (for example, of the order of hour or fraction of hour) within a monitoring time period (for example, of the order of one or more months). Just as an example, each monitoring time interval may be a 15' monitoring time interval, and the monitoring time period may be a 60 consecutive days monitoring time period: in this example the KPI database 125 is configured to store 5760 historical KPI parameters for each network cell (i.e., 4×24× 60, wherein 4 is the number of 15' monitoring time intervals in one hour, 24 is the number of hours in one day, and 60 is the number of consecutive days in the monitoring time period).

According to an embodiment, the KPI database 125 is located within the cellular network. According to an alternative embodiment, not shown, the KPI database 125 is located within the core network 115 (e.g., in one or more modules thereof). Without losing generality, the KPI database 125 may be located in any other entity of the cellular network or of the cellular communication system 100.

According to an embodiment, the network databases comprise a network database (hereinafter, MP database) 130 configured to store measurement particles resulting from a measurement campaign performed over a time period (hereinafter, campaign time period) within the monitoring time period. Just as an example, the campaign time period may comprise one or more days among the 60 consecutive days monitoring time period. According to an embodiment, the MP database 130 is configured to store, for each territorial pixel, the set of measurements of the signal levels associated with that territorial pixel, i.e. the measurements of the signal levels obtained during the measurement campaign by the tracing/reporting data associated with that territorial pixel. In the following, the set of measurements of the signal levels of each measurement particle will be concisely referred to as measured signal levels. According to an embodiment, the measured signal levels comprise a plurality of signal levels associated (i.e., associatable) with respective monitoring time intervals; just as an example, the number of measured signal levels for each monitoring time interval and for each territorial pixel may depend on a number of network elements supporting event tracing functionality and/or on a number of user devices supporting event reporting functionality, and/or on a distribution of the user devices within the cellular network at that monitoring time interval for that territorial pixel. As it should be understood, no measurement particle (i.e., no measured signal levels) might be provided for one or more monitoring time intervals (in that, for example, in those monitoring time intervals no network element supporting event tracing functionality or no user device supporting radio measurement reporting functionality was provided).

According to an embodiment, the MP database 130 is located within the cellular network. According to an alternative embodiment, not shown, the MP database 130 is located within the core network 115 (e.g., in one or more modules thereof). Without losing generality, the MP database 130 may be located in any other entity of the cellular network or of the cellular communication system 100.

According to an embodiment, the network databases comprise a network configuration database (hereinafter, NC database) 135 configured to store the network configurations. As mentioned above, the network configuration may change over time, in particular it may change as an effect of SON processes and functionalities that run in the cellular network. For example, the network configuration may be dynamically changed by SON functionalities—including those of the present invention—so as to achieve, time by time, performance optimization under the varying network conditions that derive from users' displacement and time-varying usage patterns of the network connectivity and services.

According to an embodiment, the NC database 135 is configured to store historical network configurations. According to an embodiment, the historical network configurations comprise historical cell configurations of each network cell 110, namely historical sets of cell parameters taken by that network cell 110 during the monitoring time period.

According to an embodiment, the historical network configurations comprise historical cell configurations of each network cell 110 on a day basis: in this embodiment, and in the considered example of a 60 consecutive days monitoring time period, the NC database 135 may be configured to store 60 historical network configurations (and, hence, 60 historical sets of cell parameters) for each network cell 110.

According to alternative embodiments, the historical network configurations may comprise historical cell configurations of each network cell 110 on a monitoring time interval basis: in these embodiments, and in the considered example of a 15' monitoring time interval and a 60 consecutive days monitoring time period, the NC database 135 may be configured to store 5760 historical network configurations (and, hence, 5760 historical sets of cell parameters for each network cell 110).

According to an embodiment, the NC database 135 is located within the cellular network. According to an alternative embodiment, not shown, the NC database 135 is located within the core network 115 (e.g., in one or more modules thereof). Without losing generality, the NC database 135 may be located in any other entity of the cellular network or of the cellular communication system 100.

Therefore, based on the performance and cell parameters stored in the network databases, each monitoring time interval of the monitoring time period is associated with respective KPI parameters of the network cells 110, with the respective network configuration (i.e., the cell parameters, or the sets of cell parameters, of the network cells 110), and (if tracing/reporting data are available for that monitoring time interval) with respective measurement particles (wherein each measurement particle is associated with a respective territorial pixel).

According to an embodiment, the cellular network comprises a network simulator 140.

For the purposes of the present disclosure, the network simulator 140 features electromagnetic simulation functionalities aimed at providing, over the geographic area, a priori estimates of the effects that network configuration changes (i.e., changes in the cell configuration) of one or more network cells of the cellular network) have on the area coverages of the network cells within the geographic area.

According to an embodiment, electromagnetic simulation provided by the network simulator 140 may be based on morphological information of the geographic area. An example of such electromagnetic simulation is disclosed in Hata, M. "*Empirical Formula for Propagation Loss in Land Mobile Radio Services*", IEEE Transactions on Vehicular Technology, August 1980, VT-29 (3): 317-325.

With reference to FIG. 2, it schematically shows an activity diagram of a SON method 200 according to an embodiment of the present invention.

According to an embodiment, the SON method 200 is implemented by the SON module 120. However, this should not be construed limitatively: in fact, according to an embodiment, at least a subset of the method steps may be implemented by the core network 115, and/or by one or more other entities or modules (not shown) of the cellular communication system 100.

According to an embodiment, the SON method 200 is performed at a time (hereinafter, reference time) following the monitoring time period. In the example herein considered in which the monitoring time period is a 60 consecutive days monitoring time period, the reference time may for example comprise day 61. In the following, the network configuration at the reference time will be referred to as reference network configuration RNC1. Similarly, for each network cell, the cell parameters (or the set of cell parameters) and the cell configuration at the reference time will be referred to as reference cell parameters and reference cell configuration, respectively.

According to an embodiment, the SON method 200 comprises retrieving the historical KPI parameters, the measured signal levels, and the historical network configurations (action node 205).

According to an embodiment, as mentioned above, the historical KPI parameters, the measured signal levels, and the historical network configurations are retrieved, e.g. by the SON module 120, from the KPI database 125, the MP database 130 and the NC database 135, respectively.

As mentioned above, the historical KPI parameters stored in the KPI database 125 result from a monitoring performed for each network cell and for each one of the monitoring time intervals of the monitoring time period.

As mentioned above, the measured signal levels stored in the MP database 130 comprise a plurality of sets of measured signal levels, wherein each set of measured signal levels is associated with a respective territorial pixel, and wherein each measured signal level of each set of measured signal levels is associated with a respective measured network cell at least partially covering that territorial portion, with a respective cell configuration of the measured network cell, and with a respective monitoring time interval.

According to an embodiment, the SON method 200 comprises determining estimated KPI parameters based on the retrieved historical KPI parameters, measured signal levels, and historical network configurations (action node 210).

According to an embodiment, the estimated KPI parameters are indicative of how the historical KPI parameters measured during the monitoring time period would have been if, at each monitoring time interval, the respective historical network configuration was equal to the reference network configuration RNC1.

According to an embodiment, the estimated KPI parameters are determined by means of a procedure (hereinafter, estimate procedure), discussed here below.

Basically, the estimate procedure allows compensating for network configuration changes affecting the historical KPI parameters during the monitoring time period, so that the resulting estimated KPI parameters are consistent in time and are essentially unaffected by (i.e., invariant with respect to) network configuration changes: the use of the estimated KPI parameters to perform forecast procedures (such as the forecast procedure of the SON method 200, discussed in the following) advantageously allows using long training periods without that the network configuration changes negatively affect forecast capabilities of the forecast procedures.

With reference to FIG. 3, it shows an estimate procedure 210 according to an embodiment of the present invention.

According to an embodiment, the estimate procedure 210 comprises determining (action node 305) simulated signal levels for the network cells associated with one or more measurement particles (i.e., the measured network cells, namely the network cells for which measured signal levels are available).

According to an embodiment, the simulated signal levels are determined for each measured network cell, and for each cell configuration (as indicated by the historical network configurations) taken by that measured network cell during the campaign time period. Therefore, according to an embodiment, for each measured signal level of each measured network cell, a corresponding simulated signal level for that measured network cell is determined at action node 305 (wherein each simulated signal level is simulated, for each measured network cell, based on the cell configuration corresponding to the measured signal level for that measured network cell).

According to an embodiment, the simulated signal levels are determined based on electromagnetic simulations performed by the network simulator 140.

According to an embodiment, the simulated signal level associated with each measured network cell for each network configuration is indicative of an expected or theoretical signal level that is expected to be exhibited by that measured network cell for that network configuration. For this reason, unlike the measured signal level (which is a real measurement taking into account actual conditions of the network cells and of the user devices, and hence it depends on the monitoring time interval), the simulated signal level is independent from the monitoring time interval, as it provides a hypothetical measurement in ideal or substantially ideal conditions (in other words, the simulated signal level is invariant over time in that the electromagnetic simulations do not take into account practical scenarios such as indoor attenuation, house walls, and position of the human body with respect to the antenna of the user device).

According to an embodiment, the estimate procedure 210 comprises determining, for each measured network cell and for each monitoring time interval, a difference (hereinafter, signal level deviation) between the respective measured signal level (i.e., the measured signal level being measured for that measured network cell at that monitoring time interval, as indicated by the measurement particle) and the respective simulated signal level (i.e., the simulated signal level that has been simulated for that measured network cell in the cell configuration taken during that monitoring time interval) (action node 310).

Therefore, according to an embodiment, for each measured network cell, and for each monitoring time interval for which a measured signal level for that measured network cell is available (hereinafter also referred to as available monitoring time interval), a corresponding signal level deviation for that network cell is determined at action node 310.

As it should be understood, the signal level deviation takes into account practical scenarios that are not considered in the electromagnetic simulations (such as indoor attenuation, house walls, position of the human body with respect to the antenna of the user device). As better understood from the following discussion, the signal level deviation represents a correction element that allows evaluating the effects that the changes in the network configuration have in user—network cell association.

According to an embodiment, the estimate procedure 210 comprises determining, for each measured network cell, simulated signal levels for the reference network configuration RNC1 (hereinafter, reference simulated signal levels) (action node 315). According to an embodiment, the reference simulated signal levels comprise a succession of reference simulated signal levels, wherein each reference simulated signal level is associated with a respective measured network cell in the respective cell configuration as indicated by the reference network configuration RNC1.

According to an embodiment, the simulated signal levels associated with the measured network cells for the reference network configuration RNC1 are indicative of expected or theoretical signal levels that are expected to be exhibited by those measured network cells in the reference network configuration RNC1. For this reason, as discussed above for the simulated signal levels, the reference simulated signal levels are independent from the monitoring time intervals.

According to an embodiment, the reference simulated signal levels are determined based on electromagnetic simulations performed by the network simulator 140.

According to an embodiment, the estimate procedure 210 comprises updating the measured signal levels (thereby obtaining updated measured signal levels) according to the reference simulated signal levels and to the signal level deviations (action node 320).

According to an embodiment, each updated measured signal level is determined, for each measured network cell and for each monitoring time interval (i.e., for each monitoring time interval for which a measured signal level for that measured network cell is available), as the respective signal level deviation (i.e., the signal level deviation determined for that available monitoring time interval for that measured network cell) added with the respective reference simulated signal level (i.e., the reference simulated signal level being simulated for that measured network cell in the reference network configuration RNC1). Thus, for each measured network cell and for each available monitoring time interval the updated measured signal level may be unchanged with respect to the measured signal level for that available monitoring time interval (this occurring, for example, if the historical cell configuration at that available monitoring time interval corresponds (i.e., it is equal) to the reference cell configuration), or for each available monitoring time interval the updated measured signal level may be different from the measured signal level for that available monitoring time interval (this occurring, for example, if the historical cell configuration at that available monitoring time interval does not correspond (i.e., it is not equal) to the reference cell configuration. Accordingly, the updated measured signal levels represent an evaluation of the signal levels that would have been measured at each monitoring time period if the network configuration at that monitoring period had been the same, or substantially the same, as the reference network configuration RNC1, i.e., the network configuration at the reference time.

Therefore, the updated measured signal levels represent consistent measurements of the signal levels (of the network cells) which are unaffected by the changes in the network configuration. As it should be understood, the updated measured signal levels may determine, for each territorial pixel, an updated measurement particle, and hence a different number of network cells that, in the reference network configuration RNC1, are associated with that territorial pixel. Otherwise stated, the updated measured signal levels may determine, for each network cell, an updated number of measurement particles associated with that territorial pixel: for this reason, as better discussed in the following, the updated measured signal levels are advantageously used to perform a particle-cell association that takes into account the effects of the changes affecting the measured network cells when changing from the historical network configurations corresponding to the measured signal levels to the reference network configuration RNC1.

According to an embodiment, the estimate procedure 210 comprises determining, for each measured network cell, the number of active users per measurement particle, i.e. the number of active users within each measured network cell associated with that measurement particle (action node 325).

According to an embodiment, this is achieved by determining, for each network cell and for each monitoring time interval, a ratio between the number of active users within that network cell during that monitoring time interval (as indicated by the historical KPI parameters) and a number of measurement particles which, at that monitoring time interval, are associated with that network cell. The number of active users per measurement particle so obtained is therefore indicative, for each network cell and for each monitoring time interval, of the active users, among the number of active users detected during that monitoring time interval, that are associated with that network cell in the network configuration in use (i.e., the cell configuration taken by that network cell during that monitoring time interval).

Otherwise stated, at action node 325, for each network cell and for each monitoring time interval, the corresponding KPI parameter (which, due to its aggregated nature, is distributed over the geographic area) is (e.g., equally) apportioned among the measurement particles associated with that network cell (or, otherwise stated, the corresponding KPI parameter is (e.g., equally) apportioned among the territorial portions having at least one measured signal level associated with that network cell). As better understood from the following discussion, for each monitoring time interval each apportioned KPI parameter is indicative of the number of active users that may be associated to a different network cell due to the network configuration change from the historical network configuration taken at that monitoring time interval and the reference network configuration RNC1.

According to an embodiment, the estimate procedure 210 comprises univocally associating (action node 330) each measurement particle to the network cell that is actually delivering a service to one or more user devices within the respective territorial pixel (hereinafter, particle-cell association). Otherwise stated, according to particle-cell association, each measured network cell is associated with the territorial pixel within which the measured network cell is a serving network cell, thereby obtaining one or more associated territorial pixel being associated with the measured network cell.

According to an embodiment, the particle-cell association may be performed based on the updated measured signal levels, and on at least one threshold signal level indicative of a minimum signal level for accessing the measured network cell. According to an embodiment, the at least one threshold signal level may also be indicative of a frequency layer hierarchical access threshold, and/or of a hierarchical structure (level priority) used in the cellular network among frequency layers. According to an embodiment, the particle-cell association may be performed, for each measured network cell and for each monitoring time interval, based on a comparison between the respective updated measured signal level (which refers to the reference network configuration RNC1) and the at least one threshold signal level.

According to an embodiment, the threshold signal level may comprise the frequency layers' hierarchical access threshold of each network cell. According to an embodiment, the frequency layers' hierarchical access threshold of each network cell is part of the network configuration and may be different for different network configurations.

As a result of the particle-cell association, a number of active users per network cell per associated measurement particle is obtained for each available monitoring time interval, and hence for each network cell that, as a result of the application of the network configuration RNC1, may have experienced a change in the measured signal level (as indicated by the updated measured signal levels).

According to an alternative embodiment, the particle-cell association may be performed based on a distribution matrix indicative of a user distribution within the geographic area, as discussed here below.

According to an embodiment, the portion of data traffic (hereinafter, cell traffic per particle $$T_{Cell\,x,y}^{Li,part}$$

associated with a measurement particle associated with a network cell Cell, having cell layer $L_i$ and acting as serving network cell in the territorial pixel identified by (x,y), may be expressed as follows:

$$T_{Cell\,x,y}^{Li,part} = \frac{T_{Cell\,x,y}^{Li}}{NP_{Cell,x,y}^{Li}}$$

wherein:

$$T_{Cell\,x,y}^{Li}$$

is the data traffic disposed by the network cell Cell, having cell layer $L_i$ and acting as serving network cell in the territorial pixel identified by (x,y) coordinates (hereinafter, cell traffic per pixel) and $$NP_{Cell,x,y}^{Li}$$

is the number of measurement particles associated with the network cell Cell, having cell layer $L_i$ and acting as one of the serving network cells in the territorial pixel identified by (x,y) coordinates.

According to an embodiment, the cell traffic per pixel may be expressed as:

$$T_{Cell\,x,y}^{Li} = T_{Cell}^{Li} \cdot \frac{\rho_{x,y}^{Cell}}{\sum_v \sum_w \rho_{v,w}^{Cell}}$$

wherein:

$$T_{Cell}^{Li}$$

is the data traffic disposed by the network cell Cell, having cell layer $L_i$, as obtained from the performance counters (hereinafter, cell traffic);

$$\rho_{x,y}^{Cell}$$

is the weight associated with all the measurement particles of the territorial pixel identified by (x, y) coordinates associated with the network cell Cell having cell layer $L_i$ (hereinafter, cell weight per pixel) and $$\sum_v \sum_w \rho_{v,w}^{Cell}$$

is the sum of the weight of the distribution matrix (associated with all the measurement particles associated with the network cell Cell) for all the territorial pixels (v,w) associated with that network cell Cell.

Assuming that the measurement particles associated with a same territorial pixel identified by (x, y) coordinates have same weights $\rho_{x,y}$ in the distribution matrix, the cell weight $$\rho_{x,y}^{Cell}$$

may be expressed as:

$$\rho_{x,y}^{Cell} = \rho_{x,y}^{part} \cdot NP_{Cell,x,y}^{Li}$$

wherein:

$$\rho_{x,y}^{part} = \frac{\rho_{x,y}}{\sum_{Cell} NP_{Cell,x,y}^{Li}}$$

is the part of the cell weight per pixel $$\rho_{x,y}^{Cell}$$

associated with each measurement particle of the territorial pixel identified by (x, y) coordinates (hereinafter, cell weight per particle).

Thus, the cell traffic per particle $$T_{Cell\ x,y}^{Li,part}$$

may be expressed as:

$$T_{Cell\ x,y}^{Li,part} = \frac{T_{Cell\ x,y}^{Li}}{NP_{Cell,x,y}^{Li}} = \frac{T_{Cell}^{Li} \cdot \frac{\rho_{x,y}^{Cell}}{\sum_v \sum_w \rho_{v,w}^{Cell}}}{NP_{Cell,x,y}^{Li}} =$$

$$\frac{T_{Cell}^{Li}}{NP_{Cell,x,y}^{Li}} \cdot \frac{\rho_{x,y}^{part} \cdot NP_{Cell,x,y}^{Li}}{\sum_v \sum_w \rho_{v,w}^{Cell}} = \frac{T_{Cell}^{Li} \cdot \rho_{x,y}^{part}}{\sum_v \sum_w \rho_{v,w}^{Cell}}$$

Therefore, according to an embodiment, the cell traffic per particle $$T_{Cell\ x,y}^{Li,part}$$

may be expressed as a function of the cell traffic $$T_{Cell}^{Li}$$

(which is available from the performance counters), of the cell weight per particle $$\rho_{x,y}^{part}$$

(which can be derived from the distribution matrix), and of the cell weight $$\sum_v \sum_w \rho_{v,w}^{Cell}$$

(which can be derived from the distribution matrix).

According to an embodiment, the cell traffic per particle $$T_{Cell\ x,y}^{Li,\ part}$$

so obtained may be associated with the single measurement particles within the territorial pixel identified by (x,y) coordinates and associated with the network cell Cell having cell layer $L_i$ (thereby obtaining a cell traffic per associated particles) based on a minimum access threshold for accessing each cell layer, a hierarchical access threshold for accessing each cell layer, and the updated historical signal levels.

According to an embodiment, the cell traffic per particle $$T_{Cell\ x,y}^{Li,part}$$

so obtained for a given territorial pixel may be associated also with one or more adjacent territorial pixels for which no measurement particles are available.

According to an embodiment, the user distribution may be determined based on a territorial density of the measurement particles (e.g., a number of measurement particles for each territorial pixel) rather than on the distribution matrix, and the cell traffic per particle $$T^{Li,part}_{Cell\ x,y}$$

may be determined as the ratio between the cell traffic (as indicated by the KPI parameter) and the number of measurement particles associated with the network cell in the cell configuration at the time the KPI parameter was acquired.

Back to the activity diagram of FIG. 3, according to an embodiment the estimate procedure 210 comprises determining, for each measured network cell, the estimated KPI parameter based on the apportioned KPI parameter associated with the measured network cell and on the associated territorial pixel(s) being associated with the measured network cell (action node 335).

Otherwise stated, at action node 335 the estimate procedure 210 comprises determining the number of active users for each network cell based on the number of active users per associated measurement particle. According to an embodiment, for each available monitoring time interval, the number of active users for each network cell (which corresponds to the estimated KPI parameter) is obtained by summing, for that available monitoring time interval, the number of active users per associated measurement particle on the number of associated measurement particles that are associated with that network cell (or, equivalently, summing the number of apportioned KPI parameters associated with the measured network cell on the number of associated territorial pixels being associated with the measured network cell).

Therefore, at action nodes 325-335, for each measured network cell and for each monitoring time interval, the estimated KPI parameter is determined based on the respective historical KPI parameter, the number of measurement particles having at least one measured signal level associated with the measured network cell, and on the respective updated measured signal level. According to an embodiment, for each monitoring time interval, the estimated KPI parameter so obtained is indicative of a change in the performance indicator affecting said measured network cell when switching from the respective cell configuration (i.e., the cell configuration in use at that monitoring time interval) to the respective reference cell configuration (i.e., the cell configuration taken by that measured network cell as indicated by the network configuration RNC1).

Back to the activity diagram of FIG. 2, the SON method 200 comprises configuring the cellular network according to the estimated KPI parameters determined for the measured network cells (see nodes 215-245, discussed here below).

According to an embodiment, the SON method 200 comprises determining, for the reference network configuration RNC1, forecast KPI parameters based on the estimated KPI parameters (action node 215).

According to an embodiment, the forecast KPI parameters are determined by means of a forecast procedure. According to an embodiment, the forecast procedure is configured to receive the estimated KPI parameters and to provide the forecast KPI parameters based on an artificial neural network (hereinafter, ANN network).

As the estimated KPI parameters are consistent in time and are essentially unaffected by network configuration changes, the use of the estimated KPI parameters to perform the forecast procedure advantageously allows using comparatively longer training periods for the ANN network without that the network configuration changes negatively affect forecast capabilities of the forecast procedure.

According to an alternative embodiment, the forecast KPI parameters are determined by means of proper mathematical models. Just as an example, the mathematical models may be based on the assumption that the process represented by the historical KPI parameters comprises a deterministic part (which allows estimating components such as long-term trend, cyclical movement, and seasonality/sociality factors) and a random disturbance component. Just as another example, the mathematical models may be based on the assumption that the historical KPI parameters was generated by a stochastic process with related components that can be described with appropriate probabilistic models.

According to an alternative embodiment, no forecast KPI parameter is determined. Just as an example, the estimated KPI parameters may be used as such to determine one or more further reference network configurations, different from the reference network configuration RNC1, to be used for optimization (as discussed here below).

According to an embodiment, the SON method 200 comprises determining a reference network configuration RNC2$_r$ (r=0, 1, 2, 3 . . . , R) (action node 220) and the estimated KPI parameters for the reference network configuration RNC2$_r$ (action node 225), and iterating action nodes 220,225 as long as a cost function depending on the estimated KPI parameters for the reference network configuration RNC2$_r$ is optimized (nodes 230-240).

According to an embodiment, the reference network configuration RNC2$_0$, i.e. the reference network configuration RNC2$_r$ determined at a first execution of action node 220 (r=0), is determined based on the forecast KPI parameters. According to an embodiment, the reference network configuration RNC2$_0$ is determined by varying one or more cell parameters of the network cells 110 whose associated forecast KPI parameters are different from the respective estimated KPI parameters. According to an embodiment, the cell parameter(s) to be varied may be determined based on one or more optimization algorithms, including (but not limited to) CCO ("Coverage and Capacity Optimization") algorithms or MLB ("Mobility Load Balancing") algorithms.

According to an embodiment, at each r-th iteration (r=1, 2, 3 . . . , R), the r-th reference network configuration RNC2$_r$ is determined by varying one or more cell parameters of one or more network cells (action node 220). According to an embodiment, at each r-th iteration, the cell parameters to be varied and/or the network cells whose one or more cell parameters are varied may be determined based on one or more optimization algorithms, including (but not limited to) CCO ("Coverage and Capacity Optimization") algorithms or MLB ("Mobility Load Balancing") algorithms.

According to an embodiment, the SON method 200 comprises determining (action node 225), for the reference network configuration RNC2$_r$ and for each network cell 110, respective estimated KPI parameters. According to an embodiment, the estimated KPI parameters for the reference network configuration RNC2$_r$ are determined by means of the estimate procedure 210 discussed above (which equivalently applies considering the reference network configuration RNC2$_r$ instead of the reference network configuration RNC1).

According to an embodiment, the estimated KPI parameters for the reference network configuration RNC2$_r$ are used to determine a value of a respective cost function (action node 230).

Just as an example, the cost function may depend on cell throughput (i.e. the amount of data being exchanged by a network cell on average) weighted for the data traffic disposed by the network cell as indicated by the estimated KPI parameters (for the reference network configuration RNC2$_r$) associated with that network cell.

Just as another example, the cost function may depend on user throughput (i.e. the amount of data being exchanged by a user on average). According to an embodiment, in order to determine user throughput, each user may be assumed to be assigned a respective amount of radio resources based on a proper radio resource assigning algorithm. An example of radio resource assigning algorithm is the fair scheduling algorithm (as disclosed, for example, in S Berger, A Fehske, P Zanier, I. Viering "*Comparing Online and Offline SON Solutions for Concurrent Capacity and Coverage Optimization*", 80$^{th}$ Vehicular Technology Conference Fall 2014, September 2014"), which operates by assigning the same amount of radio resources to each user.

Just as a further example, the cost function may depend, for each measurement particle, on a combination of modified measured signal levels (e.g., measured signal levels modified according to evaluation conditions useful to estimate a Quality of Service of network services (such as carrier to interference ratio (C/I)) for that measurement particle, and the portion of KPI parameter associated with that measurement particle.

Just as a further example, the cost function may be based on a combination of estimated cell parameters (e.g., cell parameters being estimated by means of the network simulator) and the estimated KPI parameters.

Optimization of the cost function may for example involve minimization or maximization of the cost function, as the case may be. In practice, optimization of the cost function might be reached, at a current iteration, when the absolute value change of the cost function from the previous iteration falls below a defined threshold or, more in general, when a threshold condition for the cost function is reached following the current iteration.

According to an embodiment, if the cost function is optimized (exit branch Y of the decision node 235), the SON method 200 comprises setting the cellular network at the reference network configuration RNC2$_r$ (action node 245).

According to an embodiment, the setting of the reference network configuration RNC2$_r$ is performed through the SON functionalities of the cellular communication system 100. According to an embodiment, the setting of the reference network configuration RNC2$_r$, is performed by the SON module 120, e.g. through the proper SON commands.

According to an embodiment, if the cost function is not optimized (exit branch N of the decision node 235), the following iteration is started (r=r+1, action node 240), and nodes 220-245 are repeated as such for the following reference network configuration RNC2$_r$.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof, on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular communication system has a different structure or comprises equivalent components, or it has other operating features. In any case, any component or module thereof may be separated into several elements, or two or more components or modules may be combined into a single element; in addition, each component or module may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to an LTE/LTE-Advanced and 5G cellular communication systems, it should be understood that it is not in the intentions of the Applicant to be limited to the implementation of any particular cellular or wireless communication system architecture or protocol. In this respect, it is also possible to provide that, with suitable simple modifications, the proposed SON method may be applied to any other cellular or wireless communication systems (e.g., 3G cellular communications systems).

The invention claimed is:

1. A method for configuring a cellular network comprising a plurality of network cells, the method comprising:

monitoring, during a monitoring time period, a performance indicator of each network cell for each one of a plurality of monitoring time intervals of said monitoring time period;

determining a plurality of sets of measured signal levels, wherein each set of measured signal levels is associated with a respective territorial portion of a geographic area covered by the cellular network, and wherein each measured signal level of each set of measured signal levels is associated with a respective measured network cell, among the plurality of network cells, at least partially within that territorial portion, with a respective cell configuration of said measured network cell, and with a respective monitoring time interval;

determining, for each measured network cell, a simulated signal level being indicative of an expected signal level for that measured network cell in the respective cell configuration;

determining, for each measured network cell and for each monitoring time interval, a signal level deviation as a difference between the respective measured signal level and the respective simulated signal level;

for a reference network configuration (RNC1) including, for each measured network cell, a respective reference cell configuration taken by that measured network cell after the monitoring time period:

(i) determining, for each measured network cell, a reference simulated signal level indicative of an expected signal level for that measured network cell in the reference cell configuration;

(ii) updating, for each monitoring time interval, each measured signal level according to the respective simulated signal level and to the respective signal level deviation;

(iii) determining, for each measured network cell and for each monitoring time interval, an estimated performance indicator based on the respective performance indicator, on a number of sets of measured signal levels having at least one measured signal level associated with said measured network cell, and on the respective updated measured signal level, and configuring the cellular network according to the estimated performance indicators determined for the measured network cells.

2. The method according to claim 1, wherein each said estimated performance indicator is indicative of a change in the performance indicator affecting said measured network cell when switching from the respective cell configuration to the respective reference cell configuration.

3. The method according to claim 1, wherein said determining, for each measured network cell and for each monitoring time interval, an estimated performance indicator comprises:

apportioning the corresponding performance indicator among the territorial portions having at least one measured signal level associated with that measured network cell;

associating the measured network cell to the territorial portion within which the measured network cell is a serving network cell, thereby obtaining at least one associated territorial portion being associated with the measured network cell;

determining the estimated performance indicator based on the apportioned performance indicator associated with the measured network cell and on said at least one associated territorial portion.

4. The method according to claim 3, wherein said associating is based, for each measured network cell and for each monitoring time interval, on a comparison between the respective updated measured signal level and at least one threshold signal level indicative of a minimum signal level for accessing the measured network cell.

5. The method according to claim 3, wherein said associating is based on a distribution matrix indicative of a user distribution within the geographic area.

6. The method according to claim 1, wherein said updating comprises, for each monitoring time interval and for each measured network cell, adding the respective signal level deviation to the respective reference simulated signal level.

7. The method according to claim 1, wherein said configuring comprises:

(a) determining a further reference network configuration (RNC2$_r$) including, for each network cell, a respective further reference cell configuration;

(b) determining further estimated performance indicators for the further reference network configuration, said determining comprising performing steps (i)-(iii) for the further reference network configuration;

(c) determining a cost function depending on the further estimated performance indicators, and iterating steps (a)-(c) until the cost function is optimized.

8. The method according to claim 7, wherein said determining a further reference network configuration (RNC2$_r$) is based on:

forecast performance indicators being forecasted from said estimated performance indicators by using:

an artificial neural network; or an optimization algorithm comprising at least one between a "Coverage and Capacity Optimization" algorithm and a "Mobility Load Balancing" algorithm.

9. The method according to claim 1, wherein the performance indicator comprises, for each network cell, at least one among a number of active users, a traffic volume managed by the network cell, and a number of users in the network cell upon occurrence of a predetermined event.

10. The method according to claim 1, wherein said determining a plurality of sets of measured signal levels is based on at least one between:

geo-localized procedure and/or event traces collected by network elements of the cellular network; and radio measurements combined with positioning information, reported by user devices connected to the cellular network.

\* \* \* \* \*